US005218382A

United States Patent [19]

Doggett

[11] Patent Number: 5,218,382

[45] Date of Patent: Jun. 8, 1993

[54] ELECTROSTATIC PRINTER HEAD STRUCTURE AND STYLI GEOMETRY

[75] Inventor: David E. Doggett, Los Gatos, Calif.

[73] Assignee: Synergy Computer Graphics Corporation, Sunnyvale, Calif.

[21] Appl. No.: 666,557

[22] Filed: Mar. 7, 1991

Related U.S. Application Data

[63] Continuation of Ser. No. 345,152, Apr. 28, 1989, abandoned.

[51] Int. Cl.[5] .......... G01D 15/06

[52] U.S. Cl. .......... 346/155

[58] Field of Search .......... 346/155

[56] References Cited

U.S. PATENT DOCUMENTS

| | | | |
|---|---|---|---|
| 2,918,580 | 12/1959 | Howell | 250/49.5 |
| 2,919,171 | 12/1959 | Epstein et al. | 346/74 |
| 3,795,010 | 2/1974 | Ring | 346/155 |
| 3,946,403 | 3/1976 | Ikeuchi | 346/74 |
| 3,958,251 | 5/1976 | Borelli | 346/74 |
| 4,588,997 | 5/1986 | Tuan et al. | 346/76 |
| 4,636,816 | 1/1987 | Playe | 346/155 |
| 4,766,450 | 8/1988 | O'Connell | 346/155 |
| 4,831,394 | 5/1989 | Ochiai et al. | 346/155 X |
| 5,077,563 | 12/1991 | Takeuchi et al. | 346/155 X |

OTHER PUBLICATIONS

Patent Abstracts of Japan, vol. 6, No. 171, Sep. 4, 1982, entitled "Electrostatic Recorder".
Patent Abstracts of Japan, vol. 5, No. 190, Dec. 4, 1981.
Patent Abstracts of Japan, vol. 12, No. 27, Jan. 27, 1988, entitled "Manufacture Of Ion Generator".

*Primary Examiner*—George H. Miller, Jr.
*Attorney, Agent, or Firm*—Skjerven, Morrill, MacPherson, Franklin & Friel

[57] ABSTRACT

Each of the plurality of styli contained in an electrostatic print head and used for placing an electrostatic charge on a dielectric coated medium has a rectangular cross section. The thickness of the cross section is selected such that the difference between the lowest voltage on the stylus at which the amount of electrical charge deposited on the dielectric medium for any increase in voltage on the stylus increases substantially in a linear fashion and the lowest voltage on the stylus at which an unwanted background image is formed on the medium is selected to have a value equal to or less than a selected number. In one embodiment this thickness is selected to minimize this difference. In another embodiment this thickness is selected to ensure that the electrostatic print head performs for some minimum lifetime. In another embodiment this thickness is selected to ensure that the distance between adjacent styli in the print head is selected such that current flowing from a stylus having a print voltage applied thereto to a directly adjacent stylus with a lower voltage applied thereto is below a selected number.

28 Claims, 9 Drawing Sheets

ELECTROSTATIC PRINTER HEAD STRUCTURE AND STYLI GEOMETRY

This application is a continuation of application Ser. No. 07/345,152, filed Apr. 28, 1989 now abandoned.

BACKGROUND OF THE INVENTION

1. Field of the Invention

This invention relates to electrostatic printers and in particular, to an electrostatic print head which utilizes a stylus of unique cross section which reduces background noise produced on the recording medium over that produced by a stylus of the prior art.

2. Prior Art

Electrostatic printers are well known. Such printers are described for example in U.S. Pat. Nos. 4,672,399, 4,672,400 and 4,731,542. Electrostatic printers use print heads containing electrically-conductive styli. Typically, these styli are round in cross section, placed close together and separated by an insulative material. When a medium passes by the styli and a voltage is applied to selected styli, electrostatic charge is deposited on the medium adjacent the selected styli such that the medium will subsequently attract and hold a toner and thereby make the charge images visible. This mechanism is well known in the art. While styli with rectangular cross section have been disclosed. to ensure that the print on the medium is dense and further to ensure that the medium can be printed with an optimum speed for the resulting desired image quality, rectangular styli have usually been selected with an aspect ratio that is made nearly one to one (i.e., the ratio of width to length of the cross section is approximately one to one). Rectangular styli whose thickness is much less than their width have also been used. See, for example, U.S. Pat. No. 4,521,790 entitled "Electrostatic Printer of Video Pictures with Grey Tones" which discloses use of a writing head having electrodes with a "Substantially elongated cross-sectional geometry such that a width dimension is significantly less than a length dimension." (Abstract, lines 4–6.) Unfortunately, styli of the '790 patent when used in a multiplexed arrangement require a considerable sacrifice in the speed at which the medium moves past styli of the electrostatic print head.

Electrostatic printing typically uses two voltage sources to effect printing. One source, which can be described as a bias source, produces a voltage difference between the styli and the print medium of a level below that necessary to effect transfer of charge between the styli and the print medium. This bias voltage is generally applied to the media through a conductive back plate arrangement to a conductive layer of the print medium which is well known in the art. Bias voltage can also be applied to the media via capacitative coupling from a set of front plates. Such arrangements are described, for example, in U.S. Pat. No. 3,611,419. It is also possible to place a DC bias voltage on styli directly. In either event, the additional voltage required to effect printing is supplied to the selected styli via an additional electronic pulsing circuit that is controlled in such a way as to produce the desired image on the print medium.

One of the problems of the prior art styli is that with a D.C. bias voltage applied to head styli that is below the voltage at which printing occurs, a spurious discharge occurs from some styli to the print medium which upon subsequent toning causes discoloration of the medium in random ways bearing no relationship to the image desired to be formed on the medium. This "background noise" is undesirable and must be reduced to a very low level if not totally eliminated. To do this, the DC bias voltage must be reduced to a lower level and consequently the pulsing circuitry, that is used in conjunction with the D.C. bias circuitry to provide the required printing voltage to the various styli in the printing head must be made capable of a larger voltage swing than before necessary. This increases cost and complexity of the electronics and shortens the life of the print head due to degradation of the insulative material between styli due to the new higher voltages between adjacent styli. This effect will be explained in detail later.

SUMMARY OF THE INVENTION

In accordance with this invention, certain disadvantages of the prior art electrostatic print heads are overcome by providing an electrostatic print head using styli of a new configuration. This new styli configuration allows reduced amplitude of the voltage swing required to provide high quality images on the print medium and consequently decreases cost, complexity and size of the electronic components used to drive the styli. Additionally, the lower pulsing voltage required by this invention reduces degradation of the insulative material between styli in the electrostatic printing head and thus increases the operational life of electrostatic print heads using styli made in accordance with this invention. Because of this lower pulsing voltage this invention allows construction of print heads with styli that are placed closer together than has heretofore been possible.

In accordance with this invention, each stylus is fabricated having a rectangular shape wherein thickness of the stylus is selected to allow use of a stylus drive voltage swing of a smaller amplitude than in the prior art while still eliminating or substantially reducing background noise.

I have discovered that background noise appearing on the print medium is to a great extent a function of the roughness of the surfaces and edges of the styli. Rough projections protruding from the surface and edge of each stylus serve as points of increased electrical fields thereby resulting in breakdown of the atmosphere between random points on the stylus and the print medium on which the image is to be formed at voltage levels lower than would be experienced by smooth-surfaced styli. Such random breakdown occurs when the difference between styli voltage and print medium voltage is at the bias voltage level prior to the time when voltage on the styli is increased to a level required to cause sustained breakdown across the entire surface of the styli in order to effect dense printing When such a random breakdown occurs, electrons are transferred to those portions of the surface of the medium directly adjacent projections on the styli to thereby form areas of spurious charge images on those portions of the medium. These charge images are subsequently developed by suitable toning apparatus so as to produce visible but spurious images. Thus, as the medium moves past a stylus held at a DC bias voltage, unwanted discolorations and streaks may appear on the surface of the medium adjacent this stylus.

I performed an experiment whereby styli of considerable width but of various selected thicknesses were connected to a voltage source. I increased the voltage applied to each stylus linearly with time between two selected values. Typically, I started with −100 volts applied to a stylus and changed voltage on the stylus linearly to −600 volts over a time period of five minutes. Simultaneously, I moved a print medium past the stylus. Thus, as the print medium moved past the stylus, voltage on the stylus was changed (i.e., increased or decreased) as a function of time. As time proceeded and the voltage increased on the stylus, small discolorations and streaks appeared on the surface of the print medium adjacent the stylus prior to the voltage on the stylus reaching a voltage level required to form a sharp, clear and dense image. One example of such discolorations is shown in FIG. 1*a* where a stylus of a thickness consistent with styli that are used in heads of the prior art was made to print on an electrostatic medium. That portion of FIG. 1*a* labeled "Background" represents the discoloration of the print medium occurring as a result of premature partial discharge of the stylus. The portion of FIG. 1*a* labeled "Linearity" shows charge being deposited by the stylus on the print medium in such a way that charge on the print medium (i.e., the voltage) increases linearly with a subsequent increase in stylus voltage. In this portion of the figure the amount of charge applied to that portion of the print medium adjacent the stylus is directly (i.e., linearly) proportional to the incremental increase in voltage on the stylus. FIG. 1*b* (placed directly adjacent FIG. 1*a*) illustrates coloration on the print medium from the application of a voltage to a stylus of the present invention in the same manner as applied to a prior art stylus. The white portion indicates that no discharge of electrons occurs from the stylus to the medium when voltage on the stylus is below the threshold for linearity. The dark portion on the right of FIG. 1*b* is the printed image that corresponds to voltages on the stylus sufficient to cause the number of electrons discharged from the stylus to the print medium to vary linearly as a function of change in stylus voltage. Note that the print medium as shown in FIGS. 1*a* and 1*b* is moving to the left (i.e., time increases to the right in both FIGS. 1*a* and 1*b*) and the horizontal bands shown formed in FIGS. 1*a* and 1*b* are each formed by one extended stylus having a width of about one-half inch.

In accordance with one embodiment of this invention utilizing copper styli where the styli are fabricated to be less than five ten thousandths of an inch (i.e., 0.0005") thick, a head can be fabricated that significantly reduces background noise on the medium on which the image is to be formed while using a pulsing voltage to produce a sharp, clear, dense image that is lower than pulsing voltages used in the prior art.

This invention will be more fully understood in conjunction with the following detailed description taken together with the attached drawings:

DETAILED DESCRIPTION

This invention will now be described in conjunction with several embodiments of the stylus. This description is not intended to be limiting but is intended to be merely illustrative of the concepts of the invention.

Figure 1A:
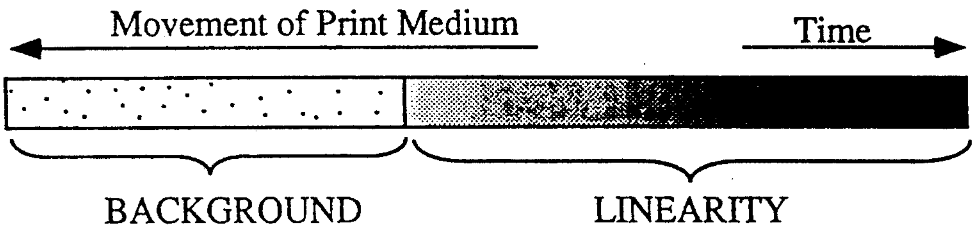
FIG. 1*a* illustrates the image formed on a print medium by an extended stylus which produces significant background noise below the voltage level for linear printing.
Figure 1B:
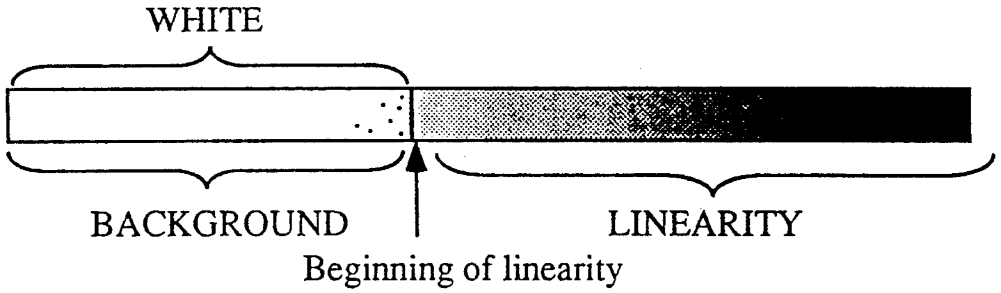
FIG. 1*b* illustrates the image formed on a medium by an extended stylus, made in accordance with this invention, which produces little or no background noise below the voltage level for linear printing.
Figure 2:
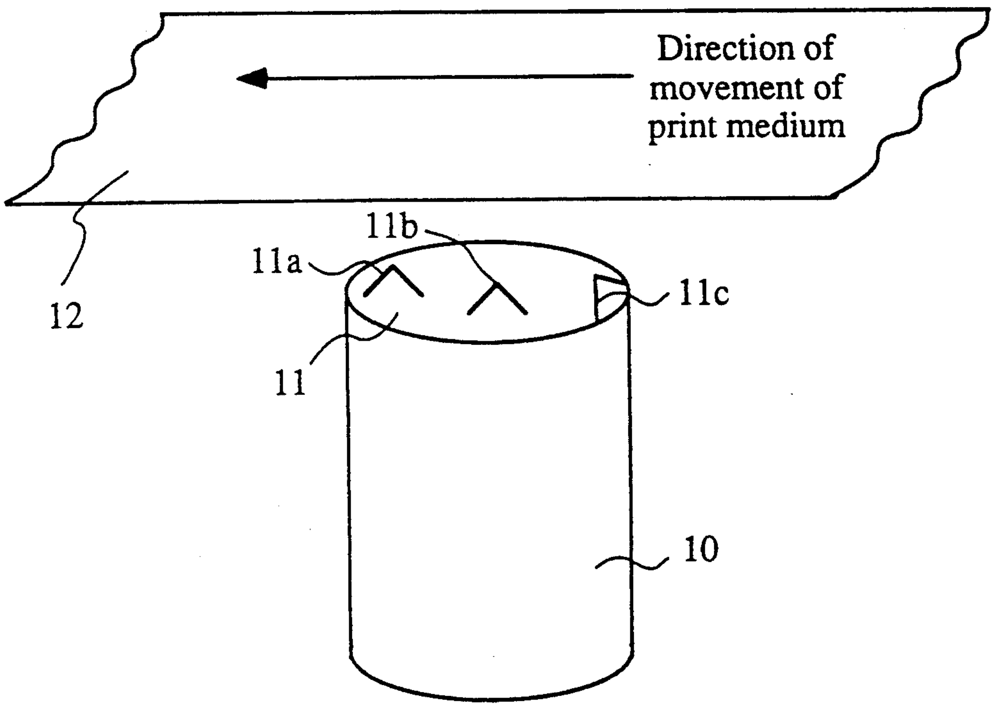
FIG. 2 illustrates in cross section the rough projections thought to be on the surface and edge of a stylus which are believed to cause the background noise of the type illustrated in FIG. 1*a;*

FIG. 2 illustrates stylus 10 (one of a plurality of such styli in an electrostatic printing head such as disclosed for example in U.S. Pat. No. 4,419,679 issued Dec. 6, 1983 entitled "Quadrascan Styli for Use in Staggered Recording Head") of round cross section with projections 11*a,* 11*b* and 11*c* formed on the surface thereof. Print medium 12 is shown moving past surface 11 of stylus 10 to the left. When voltage is applied to stylus 10, it is thought that projections (such as 11*a,* 11*b* and 11*c*) on the stylus (these projections are not drawn to scale but are exaggerated for illustrative purposes) serve as sites for spurious discharge of electrons. These spurious discharges result in background noise on print medium 12 of the type shown in FIG. 1*a* in the portion labeled "Background." Because the electric field is higher at the edges of a stylus (whether round or square) spurious breakdown occurs first at the edges of the stylus rather than in the center of the stylus. This is well known in the art. This same spurious breakdown is believed to be initiated at any small localized stylus surface irregularity. It is my further belief that as the size of the irregularity decreases the probability of a spurious breakdown occurring will increase. However, at some point, a further decrease in irregularity size causes no further change in probability of a spurious discharge to initiate.

Figure 3:
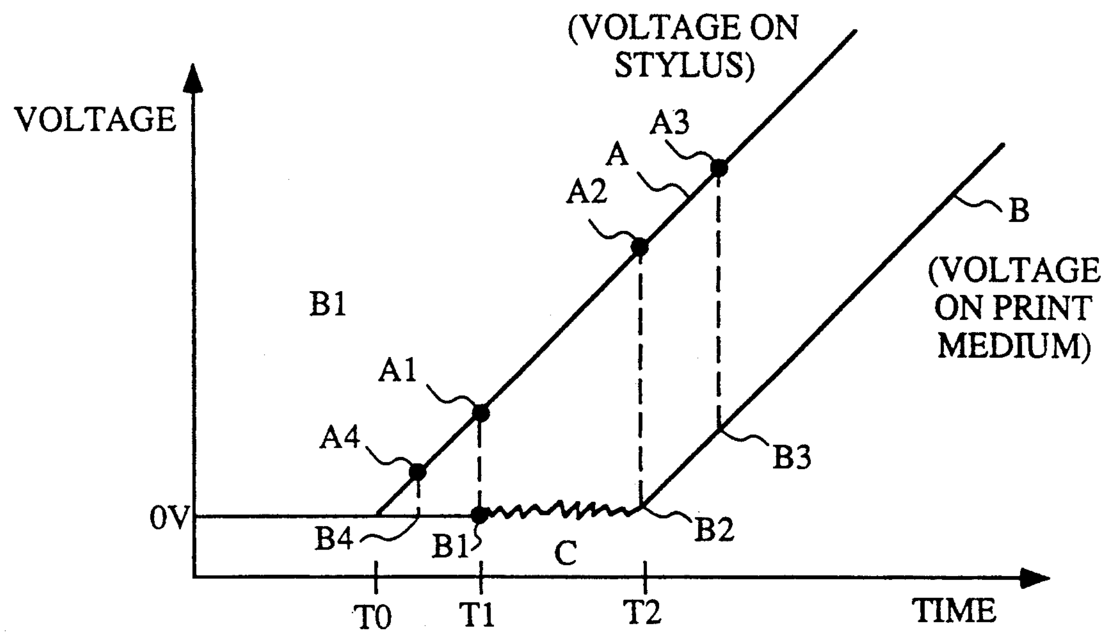
FIG. 3 is a plot of voltage versus time as applied to a stylus and the corresponding voltage appearing on the print medium which illustrates the generation of background noise during the time before voltage on the stylus reaches a point where voltage on the print medium (such as paper), induced by voltage on the stylus, becomes a linear relationship.
Figure 4:
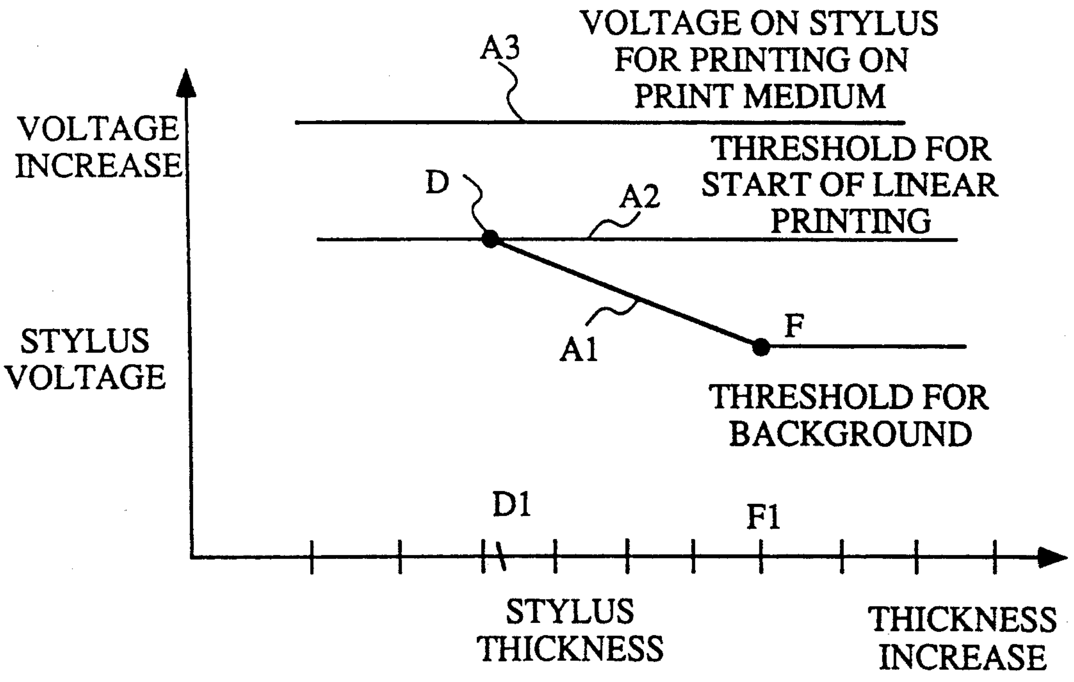
FIG. 4 illustrates in conceptual form, as a function of the thickness of the stylus, stylus voltage A3 at which a crisp, sharp, dense image is formed on the print medium, stylus voltage A2 at which voltage on the print medium becomes linear and stylus voltage A1 at which backgrounding begins to occur on the print medium and shows the decrease in the required stylus pulsing voltage made possible through use of this invention.
Figure 5:
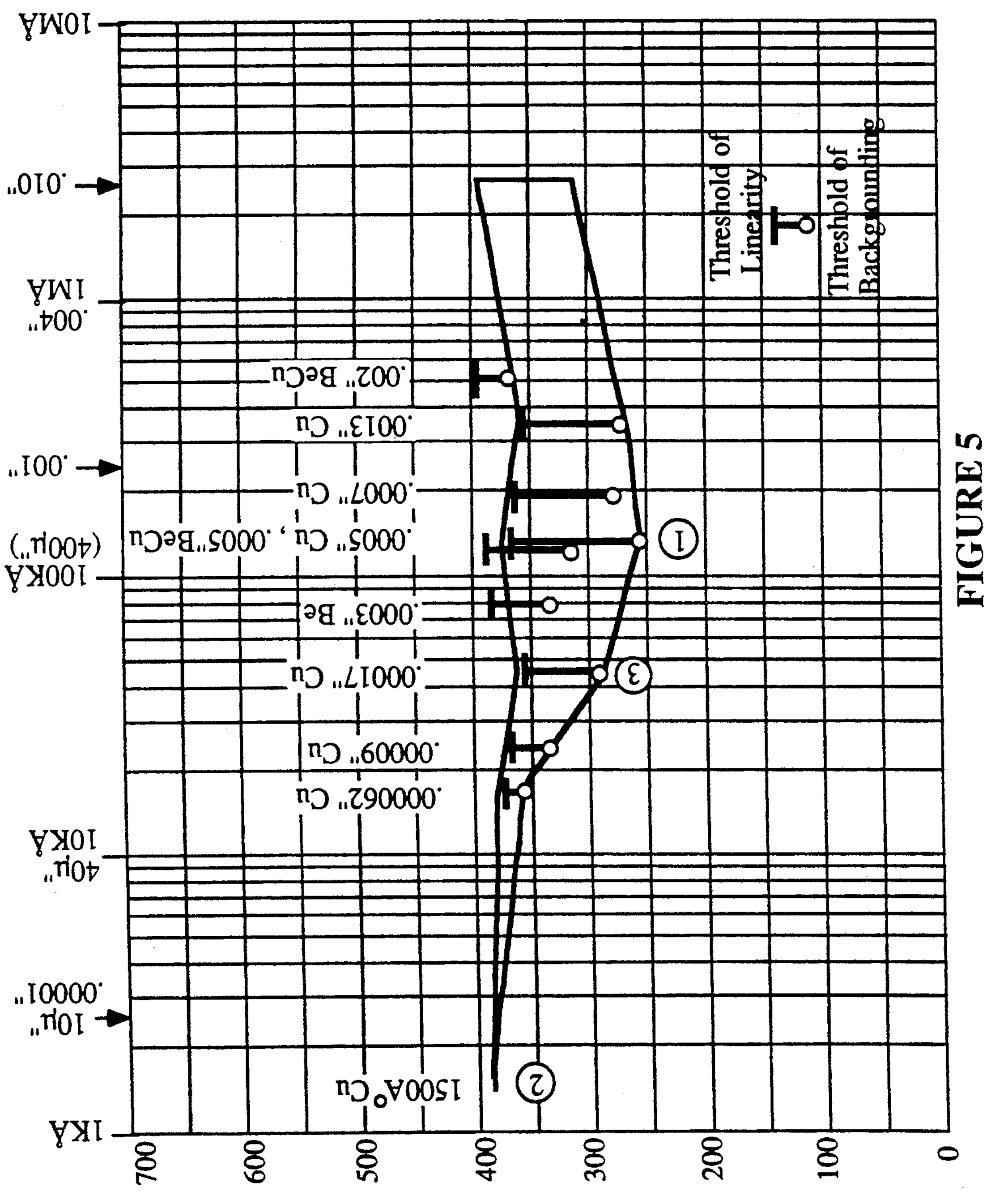
FIG. 5 is a plot of experimental data using copper styli that illustrates the difference between voltage on a stylus at which background noise starts to appear on the medium and voltage on a stylus at which linear printing begins on the medium as a function of the thickness of a stylus of rectangular cross section together with data from selected experiments using other stylus materials.
Figure 6:
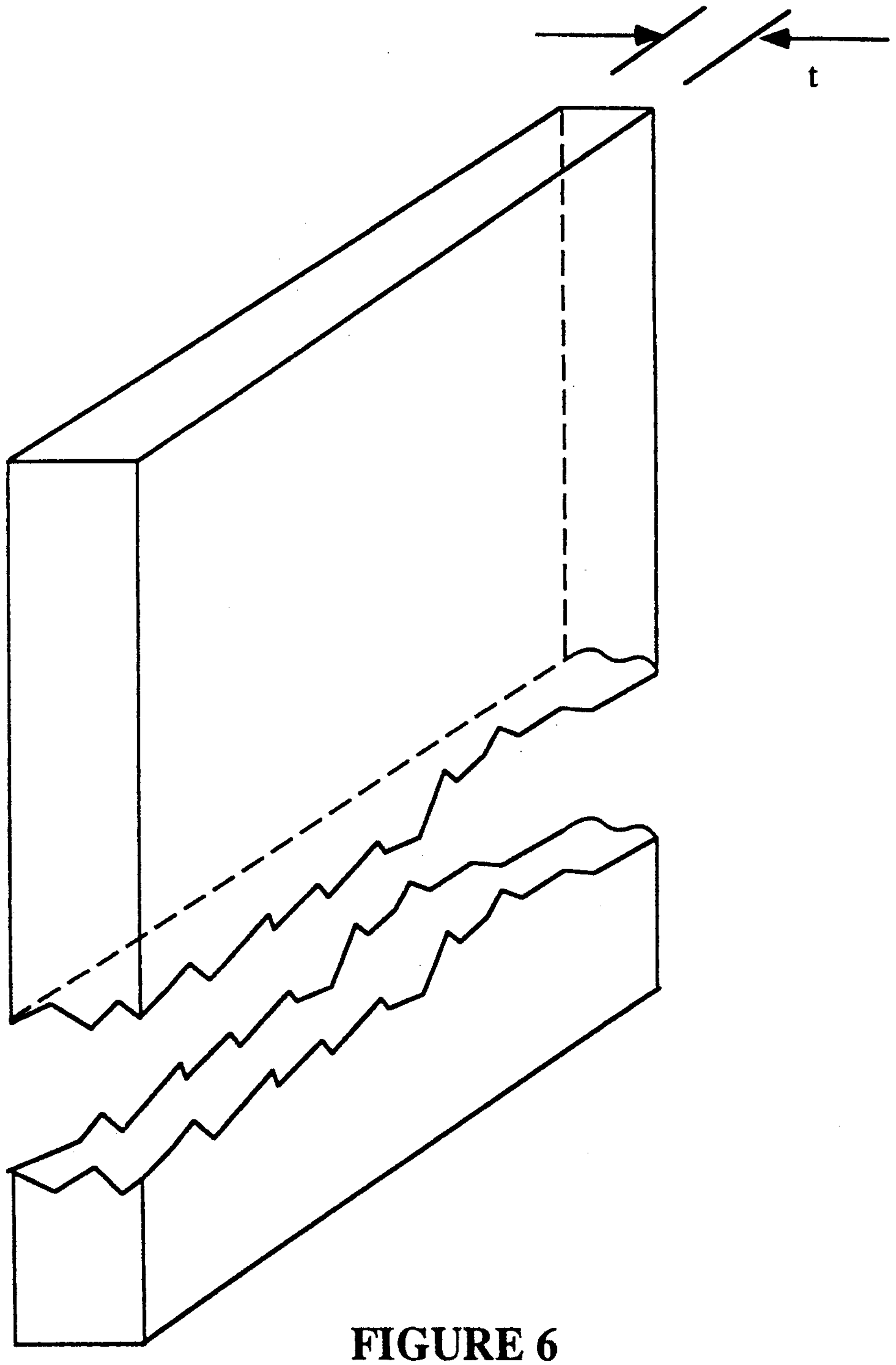
FIG. 6 illustrates in isometric view the cross section of a styli with a thickness of "t" fabricated so as to achieve significant reduction in background noise in accordance with this invention.

I proceeded with the assumption that by making each stylus of a rectangular cross section and then by reducing the thickness of the stylus, ultimately the thickness of the stylus would approach the size of the surface irregularities that cause spurious discharge. As the stylus itself approaches a dimension equal to the dimensions of the surface irregularities, the average voltage for stylus discharge approaches the average voltage at which the irregularities discharge thereby reducing the backgrounding region. To verify this, I investigated discharge characteristics of a stylus of rectangular cross section as a function of its thickness. FIGS. 3, 4 and 5 illustrate certain of the results of this investigation. FIG. 3 illustrates part of this investigation wherein voltage A, increasing with time, is applied to a stylus and voltage B is thus induced on a moving print medium above the stylus. At time T0, voltage A, increasing linearly with time, is applied to the stylus. Voltage B on the moving print medium (typically a dielectric coated paper) opposite the stylus remains approximately zero until time T1. During the portion of time between T1 and T2 denoted by the portion of curve B in FIG. 3 labeled "C", voltage B on the print medium demonstrates "noise" reflecting the formation of random background images on the print medium. This is due to spurious intermittent breakdown of the atmosphere between the stylus and the print medium as previously discussed. I believe this spurious breakdown is caused by portions of the surface of the stylus having high electric fields due to imperfections such as 11*a*, 11*b* and 11*c* in surface 11 of stylus 10 shown in FIG. 2. At time T2 voltage A on the stylus reaches the value A2. After time T2 voltage B on the print medium begins to increase approximately linearly with time at substantially the same rate as voltage A on the stylus. This is the linear portion of operation of the system. When voltage A on the stylus reaches A3, voltage B on the print medium reaches B3 and with subsequent toning the image will be cleanly, densely and sharply formed on the medium.

FIG. 3 was generated as part of an experimental test to determine the point at which background noise on the print medium is generated as voltage is increased relatively slowly on a stylus. In actual operation, the stylus operates in a digital fashion and is either on (at which point the voltage on the stylus is that shown at point A3) or off (at which point the voltage on the stylus is typically that shown at point A4 selected to be beneath A1 so as to eliminate background noise entirely). As a general rule it is desirable to minimize the voltage swing between turning on and turning off a stylus. In order to accomplish this, voltage difference A3−A4 on the stylus should be made as small as possible. Voltage on the print medium corresponding to the stylus being on is that voltage shown as B3 and voltage on the print medium when the stylus is off is that voltage shown as B4 which is essentially zero. In a conventional head driven by conventional electronics, when a stylus is being turned "on", stylus voltage increases rapidly with time (a typical rise from A4 to A3 takes 1 to 10 micro seconds) while the time during which the voltage on the stylus is "on" (i.e., is at point A3) is typically 80 micro seconds. The fall time of voltage on the stylus from point A3 to point A4 is also rapid (typically 1 to 10 micro seconds). Looking at FIG. 3, if the voltage on a stylus when the stylus is off is at a level slightly higher than the level depicted by A1, background noise would be generated on the print medium and as a result voltage B on the paper would fluctuate slightly with time due to the presence of voltage A on the stylus, together with the process of spurious discharges caused by stylus irregularities. Naturally, the off voltage on the stylus could be lowered to A4 such that voltage B on the print medium moves to voltage B4, to the left of region C, on the curve shown in FIG. 3 and therefore no background noise would be formed on the print medium. However, doing this will cause the voltage difference between printing and not printing (A3−A4) to increase and the drive circuitry will be more complex and expensive due to the larger voltage swing required. Indeed, even if voltage difference A3−A1 were used by the stylus to print, the voltage swing required to be provided by the electronics would include voltage difference A2−A1 which would be necessary to reduce background noise on the print medium and yet would not contribute to creating a clean, dense, sharp image on the print medium. Accordingly, this is undesirable. Indeed, the goal to minimize cost and complexity is to make the voltage swing from "printing" to "no printing" as small as possible An additional goal is to produce, when printing, a "printing" voltage B3 on the medium which provides a clean, dense and sharp image and to provide, when not printing a "no printing" voltage of zero volts on the print medium which leaves the medium free from background discolorations.

This problem is complicated in the usual electrostatic print head where printing is controlled by a multiplexed series of drive voltages. In such a multiplexed system, a plurality of styli uniformly spaced from each other are connected together in a number of groups such that when one stylus of a particular group of styli is selected to print and is consequently pulsed, all corresponding styli in the other groups are likewise pulsed. Actual printing is effected by a second pulsing voltage being coupled to the medium via a series of backplates. This second pulsing voltage is applied to the medium locally and serves to establish the "bias" voltage in a spatially defined region around a particular group of styli. When a stylus in one group is energized, the corresponding styli in each of the other groups will similarly be energized even though backplates associated with the other groups of styli are not activated and therefore styli in the nonselected groups will not print clear, dense, sharp images on the print medium. If the level of pulsing voltage on the styli are in the range between A1 and A2 in FIG. 3, faint images called "ghosts" are often formed on the print medium beneath these other nonselected groups of styli. Ghosting was addressed in U.S. Pat. No. 3,792,495 issued Feb. 12, 1974 on an application of Art Bliss, et al. Ghosts can also be formed if the electrical characteristics of the print medium are not correct. If resistance of the conductive layer of the print medium is not optimized then the locally applied "bias" voltage from the selected backplate will unduly spread and affect styli outside of the styli group selected, so as to cause a voltage difference between the print medium and corresponding selected styli in nonselected groups near the selected group to be in the range between A1 and A2. To reduce or eliminate this ghosting, the pulsing voltage supplied to the backplates can be increased and the pulsing voltage applied to the styli being used to deposit charge on the medium reduced to below voltage A1 in FIG. 3. Unfortunately, the increase of pulsing voltage on the backplate adjacent the group of selected styli will cause a voltage difference between styli and the print medium such that those styli in the selected group which are selected not to print on the print medium will now experience a voltage difference between the print medium and themselves in the region between A1 and A2 thereby causing backgrounding under those nonselected styli. This trade off is well known in the art.

As will be seen from a further description of this invention, using beryllium copper or another material of equivalent properties for the styli will allow an electrostatic print head to be constructed which will allow a wider range of stylus voltages and backplate voltages to be used in the prior art multiplexed print system, while at the same time eliminating and minimizing the above-described ghosting and spurious writing. Such a prior art multiplexed structure is shown in FIG. 8.

Figure 8:
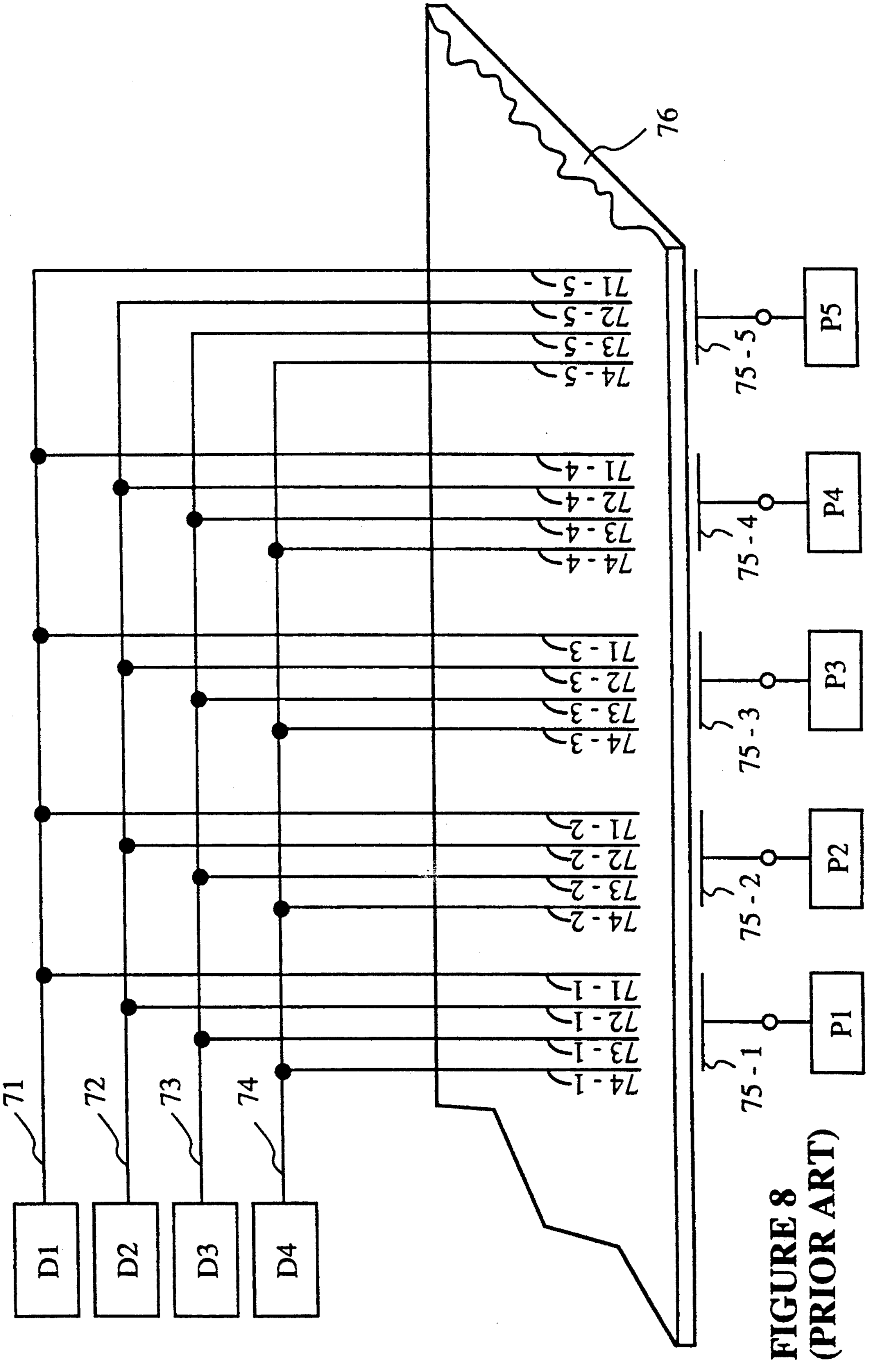
FIGURE 8 (PRIOR ART)
FIG. 8 illustrates a multiplexing scheme of the prior art by which voltages are applied to groups of styli thereby to selectively cause predefined images to be formed on the print medium.

In FIG. 8, four driver circuits D1 through D4 are utilized to drive each of four sets 71, 72, 73 and 74 of styli which together comprise the styli in one electrostatic print head. Five additional driver circuits P1 through P5 are shown schematically to drive respectively field plates (or backplates) 75-1, 75-2, 75-3, 75-4 and 75-5 which contact the conductive back side of print medium 76. The print medium is of a type that is well known in the art of electrostatic printing. Field plates 75-1 through 75-5 are shown on the back side of print medium 76, but this is not essential. As is well known in the art, plates 75-1 through 75-5 could be placed on the same side of print medium 76 as the styli and the potentials on plates 75-1 through 75-5 would then be capacitively coupled into print medium 76 through the dielectric layer to the conductive layer on the back side of print medium 76. In operation, when a selected stylus, such as stylus 71-1, is to print, the group 71 styli (containing stylus 71-1, 71-2, 71-3, 71-4 and 71-5) in which stylus 71-1 is located are driven to a selected drive voltage E3 (typically −275 V) and backplate 75-1 is then driven to a voltage E4 (typically +275V). Thus the voltage difference between the styli in group 71 and the conductive layer of print medium 76 in the region near backplate 75-1 is such as to deposit charge on the print medium adjacent to stylus 71-1. Should other styli in group 71 be desired to print, then after backplate 75-1 has been returned to zero backplates opposite these other styli must be activated in sequence from backplate 75-2 through backplate 75-5 to cause selected styli in group 71 adjacent these four backplates to print. In practice, all styli adjacent a given backplate, such as backplate 75-1, which are selected to print on print medium 76 are driven by their appropriate driver circuits simultaneously such that when backplate 75-1 is activated and raised to voltage E4, all of styli 71-1, 72-1, 73-1 and 74-1 adjacent backplate 75-1 which are selected to print in fact do so. Subsequently, selected styli in groups 71 through 74 adjacent backplate 75-2 are simultaneously activated such that when backplate 75-2 is raised to voltage E4, those styli which are selected to print actually do so. The remainder of the styli adjacent the remaining backplates are similarly activated and the selected styli are driven to print in coordination with the sequential activation of backplates 75-3, 75-4 and 75-5.

Experiments were run to determine the effect of thickness of a stylus on voltages A1 (shown in FIG. 3 as the voltage on a stylus at which background noise on the print medium begins), voltage A2 (the voltage on a stylus at which charge begins to be linearly deposited on the print medium in response to an increase in voltage on the stylus) and voltage A3 (the voltage on a stylus at which the stylus is normally operated to deposit charge on a print medium such that the subsequent application of toner produces a crisp, dense, clear image on the print medium). Note that voltage A2 achieves essentially zero voltage (B2) on the print medium and thus theoretically a zero image on the print medium but any subsequent increase in voltage on the stylus above voltage A2 produces a corresponding increase in charge on the print medium and thus an increase in image density on the print medium.

Turning now to FIG. 4, the advantage of reducing the thickness of styli used in electrostatic print heads in accordance with this invention is conceptually shown. FIG. 4 shows that by reducing stylus thickness, the voltage difference between A3 (the voltage on the stylus at which a sharp, dense clean image is formed) and A1 (the voltage on the stylus when no background image is to be formed) is reduced. The lower curve A1 corresponds to the voltage on a stylus as a function of stylus thickness at which background noise begins to appear on the print medium. As stylus thickness decreases below point F1 on FIG. 4, threshold voltage A1 for backgrounding increases The curve labeled A3 corresponds to the voltage on the stylus at which the desired image density is formed on the print medium. This voltage A3 is relatively constant FIG. 4 shows that by reducing thickness of the stylus, the difference between these voltages (A1 and A3) is significantly reduced. The curve A2 in FIG. 4 represents voltage on the stylus at which charge begins to be deposited linearly upon the print medium. At point D, the two voltages A1 and A2 become approximately the same. At stylus thickness D1 corresponding to point D, it is assumed that the thickness of the stylus is of a dimension on the order of the size of the projections that cause spurious charge transfer. Thus for a stylus of thickness D1 or less, substantially no spurious streaks or undesired marks are caused on paper for stylus voltage A (FIG. 3) slightly below the threshold (A2) for linear printing. At point D, voltage A2 is substantially equal to voltage A1. Consequently, voltage difference A3-A1 will be minimized. In one embodiment, a copper stylus was utilized. Stylus thickness F1 at which the two curves A1 and A2 on the graph in FIG. 4 start to come together (point F on curve A1) was 0.0005 inches. Therefore, a thickness of styli less than about 0.0005 inches results in a reduction of voltage difference A3-A1 required to produce clean, dense, sharp printing on the one hand, and produce a print medium that is free from unwanted spurious discolorations on the other hand.

EXPERIMENT 1

Figure 7:
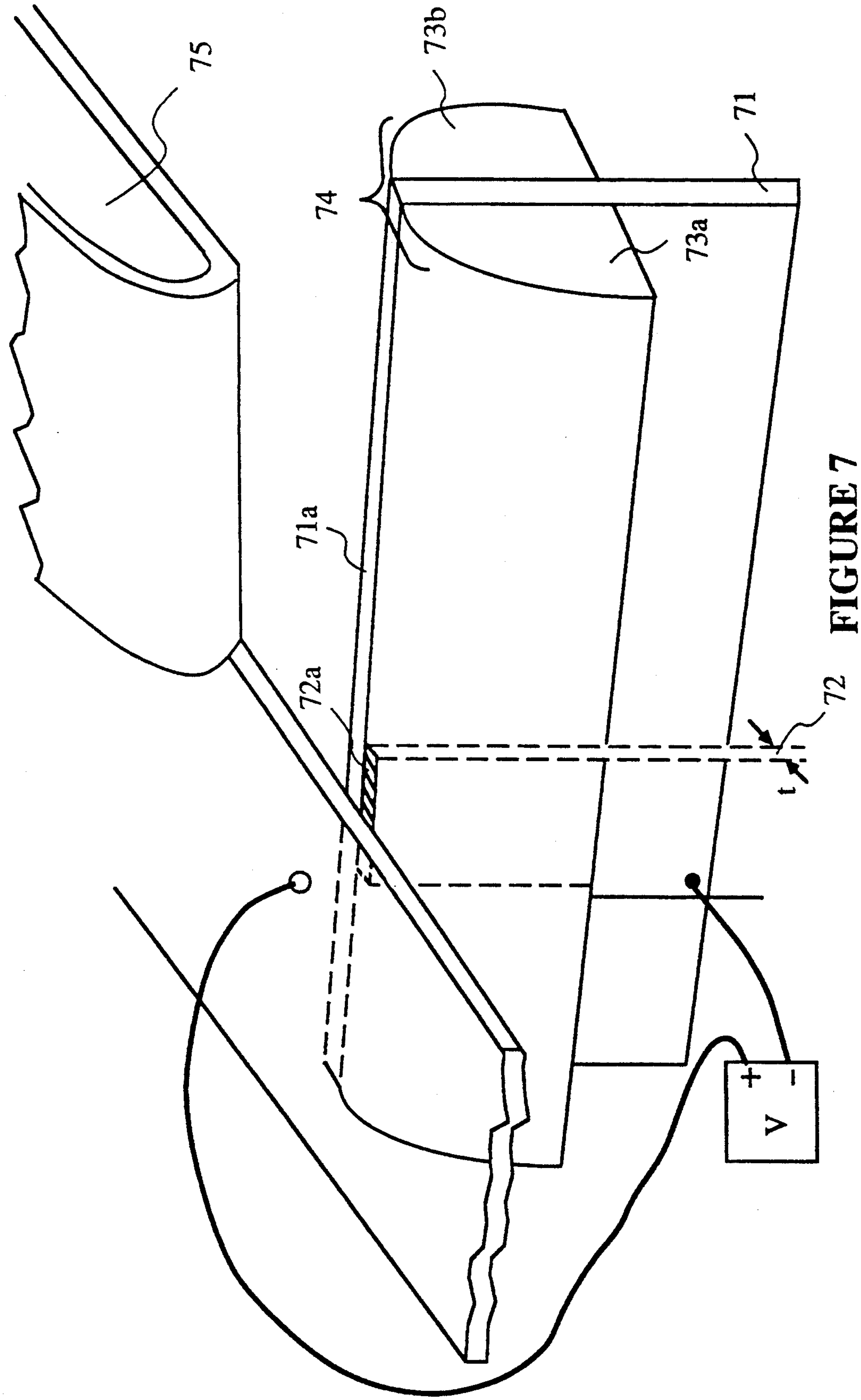
FIG. 7 illustrates in isometric view a test stylus fabricated in accordance with this invention mounted in an insulative holding material such as a glass-epoxy laminate.

FIG. 7 illustrates schematically the experimental structure employed to determine the effect of thickness of styli on the image formed on the print medium.

A 0.0005 inch thick copper film 72 (see FIG. 7) was formed on Printed Circuit (PC) board made of electrically insulating substrate 71. The laminated PC board-copper structure was then mounted between thick glass-epoxy laminate such that regions 73*a* and 73*b* of the glass-epoxy material were adjacent to the copper- PC board laminated structure. Top surface 74 of the composite glass epoxy-copper-substrate laminate containing stylus 72a was then rounded to give a radius of approximately two to three inches (the radius was not crucial to the experiment). A print medium 75 (dielectric paper, type 2089, supplied by James River Graphics, South Hadley, Ma., was then passed over region 74 which contained stylus 72a (the end surface of conductive material 72) as shown in FIG. 7. Voltages A1, A2 and A3 defined above and shown in FIGS. 3 and 4 were then determined. This was done by linearly increasing stylus voltage in a negative direction using a Wavetek function generator (Model 801, supplied by Wavetek, San Diego, Calif.) connected to a TREK high voltage Op Amp (Model 601 supplied by Trek Inc. Medina, N.Y.) from a nominal voltage (sometimes zero but sometimes a voltage other than zero such as −200 volts) at a rate of about −100 volts per minute while passing dielectric paper past and adjacent to the stylus at a rate of one half inch per second. The test structure used was installed in a machine such as described in U.S. Pat. No. 4,731,542 issued Mar. 15, 1988 on an application of David Doggett. The back of the print medium was contacted by a conductive fabric available from Schlegel Corp., Rochester, N.Y. that also served to press the medium against the stylus test structure so as to supply a normal force on the medium and cause the medium to maintain an average distance of 10 microns from the stylus. This is well known in the art. Voltage B on the dielectric paper was measured by an electrostatic voltmeter (TREK model 565). in a manner well known in the art. Voltage B was then plotted as a function of time. together with voltage A on the stylus. Results are shown in FIG. 3. For the 0.0005 inch thick copper stylus (approximately 0.5 inches wide) voltage A1 was about 235 volts and voltage A2 was about 360 volts. Thus the difference between voltage A1, at which backgrounding becomes apparent on the dielectric paper, and voltage A2, at which charge becomes linearly deposited on the paper, is about 125 volts. Consequently, to avoid backgrounding, voltage A on the stylus must be dropped beneath 235 volts (voltage A1) when the stylus is "off" and must be raised above 360 volts (voltage A2) by an additional voltage necessary to produce dense printing. The additional voltage necessary to produce dense printing is typically 150 volts. Voltage A3 necessary to produce dense printing is shown in FIG. 3 and corresponds to voltage B3 on the print medium. Consequently, a voltage swing of about 275 volts is required on the stylus to go from a state of no printing on the print medium to a state of dense, acceptable printing on the print medium. Such a large excursion requires expensive electronics.

Figure 9:
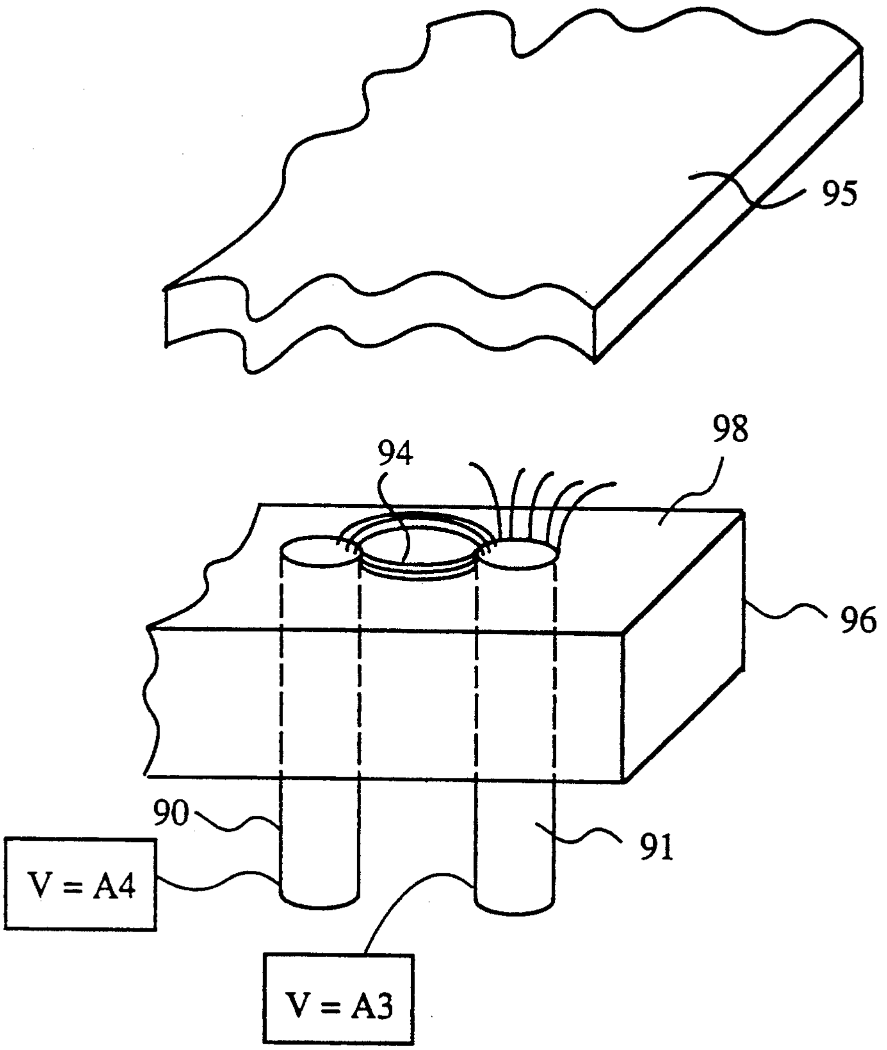
FIG. 9 illustrates the flow of current from styli 91 held at high voltage to directly adjacent styli 90 held at low voltage when styli 91 is driven to a voltage sufficient to deposit charge on that portion of electrostatic medium 95 directly adjacent the top surface of stylus 91.
Figure 10:
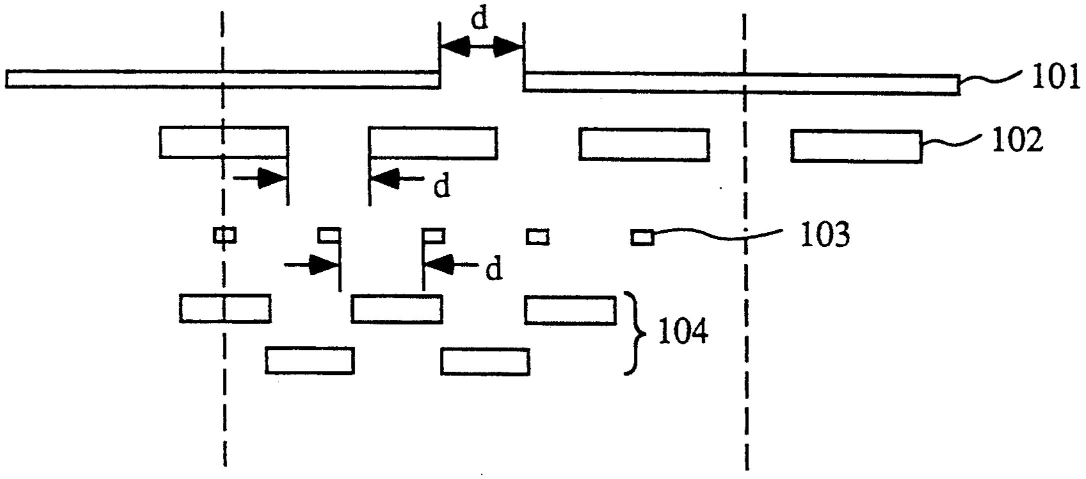
FIG. 10 illustrates the effect of increased distance between styli on the resolution attainable for styli of the prior art.

In addition, an electrostatic print head contains a plurality of styli, each stylus being closely spaced and separated by insulative material from the directly adjacent stylus or styli. The requirement that one stylus have a voltage such as A3 impressed upon it, for it to print as shown in FIG. 3, and that the directly adjacent stylus be at a voltage such as A1 or beneath, in order to eliminate backgrounding, creates a large voltage difference between the two adjacent styli. Voltage difference A3−A1 can cause a current flow between the two directly adjacent styli. This is shown in FIG. 9. In FIG. 9 styli 90 has impressed upon it voltage substantially equal to A1 (see FIG. 3) such that stylus 90 does not print to medium 95. Stylus 91 has impressed upon it voltage that is substantially equal to A3 such that it will transfer sufficient charge to medium 95 to produce a dense, clean, sharp image. Voltage difference A3−A1 causes current to flow between styli 91 and 90 in the presence of the excited atmosphere caused by the discharge between stylus 91 and medium 95. This atmosphere is trapped between electrostatic printer head 96 and medium 95. Because of the magnitude of voltage difference A3−A1, the resulting current that flows from stylus 91 to stylus 90 is of a level that can degrade insulating material 98 and produce an area 94 of pitting between styli 91 and 90 such that performance of the print head 96 is adversely affected. In response to the decrease in performance of electrostatic print heads caused by pitting, styli of the prior art have of necessity been placed farther apart so that resulting increased distance will decrease unwanted current flow and thereby increase lifetime of the print head. The requirement of increased distance serves to limit resolution that can be achieved in a print head and also serves to limit spot size produced by a stylus of the prior art so as to create areas of white between the toned images of two adjacent styli that are selected to print thereby limiting the density of the image produced. This effect is described in U.S. Pat. Nos. 3,798,609 and 3,157,456. In FIG. 10, several rows of styli (101-104) are drawn to illustrate the effect of increased distance between styli on the resolution attainable with styli of the prior art. In a low resolution printer, styli 101 are large and distance d between styli is a small percentage of the total area that would be printed if, for instance, two adjacent styli printed simultaneously. In a higher resolution printer, styli need to maintain the same distance d between them in order to limit unwanted current between styli, but because the print head has a higher number of styli for a given head length (i.e., higher resolution) the area between styli becomes a larger percentage of the total printed area and the consequent print density will decrease. This effect is clearly seen in styli 103 where the resolution desired is closely related to distance d required between styli to reduce unwanted current. Indeed, this problem has led prior art print heads to be constructed with two, three and even four rows of styli in order to produce a print head that simultaneously offers high resolution and dense printing of defined images together with long print head life.

A styli configuration such as 104 can achieve high resolution while maintaining a large separation between adjacent styli, but such a head would require accurate matching of rows of styli during manufacture and would require storing (buffering) of information between the two rows. This is well known in the art. Considering that each styli is of the order of 0.0025 inch and the length of a print head could be 36 inches or even greater, the difficulty of manufacturing a head with matched rows of styli is considerable. Such difficulties are mentioned in copending application entitled "Improved Electrostatic Printhead" filed on the same day as this application on an invention of Doggett, Mitchard and Dahlquist.

Styli of the present invention allow a head to be constructed where the distance between styli can be a smaller number than styli of the prior art thereby allowing a head of higher resolution to be produced with a single row or with multiple rows of styli while still producing a print of high optical density. This is accomplished by reducing or eliminating background region C (see FIG. 3). Reduction of backgrounding region C with the consequent reduction of voltage difference A2 minus A1 (see FIGS. 3 and 4) would reduce the required voltage difference between adjacent styli and would therefore lower unwanted current flow between adjacent styli which would increase lifetime of insulating material between styli, thereby increasing lifetime of the print head. Therefore, it is desirable that a change in voltage on a stylus from a state of no printing to a state of printing be made as small as possible. In accordance with this invention I have discovered that it is possible to significantly reduce the voltage difference between styli by making a stylus much thinner than heretofore thought appropriate in the art.

EXPERIMENT 2

My second experiment was conducted using a 1500 angstrom thick stylus consisting of essentially copper attached to a Kapton film substrate by a thin chrome adherent layer.

In this experiment conductive layer 72 (FIG. 7) was comprised of a thin layer of chromium (thickness of this layer is not known exactly but is believed to be around 50 to 100 angstroms) upon which was formed a thicker layer of copper (thickness of copper was such that total thickness of the composite layer is believed to be about 1500 angstroms). The chrome underlayer between copper and Kapton was required because copper does not adhere well to Kapton but chrome does. Copper, on the other hand, adheres well to chrome. Formed on both sides of the resulting laminate of Kapton, chrome and copper were glass epoxy composite materials 73*a* and 73*b*. This glass epoxy material 73*a*, 73*b* is commonly obtained from printed circuit board manufacturers and suppliers. Thickness of this material on each side of the styli was nominally about three-eighths (i.e., $\frac{3}{8}$") inch. Ends 71*a* and 72*a* of the Kapton and conductive layer respectively, which form the test stylus and backing laminate, protrude from glass epoxy materials 73*a* and 73*b* upon initial lamination. These ends and the adjacent glass epoxy materials subsequently were smoothed and polished so that a radius of about two to three inches was formed at top surface 74 of the structure. This radius allowed the medium (typically dielectrically coated paper of the same manufacture used in Experiment 1) to easily pass over surface 74 and the experimental stylus 72*a*. Connection was made to conductive layer 72 by means of an alligator clip as in Experiment 1 and voltage A was supplied to layer 72 and was varied as in Experiment 1 while dielectric paper 75 was moved past the stylus. Dielectric paper 75 was held an average distance of about ten (10) microns from stylus 72 by either spacer particles in the surface of the paper or by the average roughness of the paper stock as is well known in the art of making paper for use in electrostatic printers. Voltage A1, A2 and A3 (FIGS. 3 and 4) were determined. Voltages A1 and A2 coincided and were about 385 volts as shown in FIG. 5 by point 2 on the graph. Voltage A3 was about 535 volts. The voltage difference A3−A1 was about 150 volts.

Thus, the threshold for linear deposition of charge on the media (such that an increase in voltage on stylus 72 (FIG. 7) would increase linearly the charge deposited on print media 75) was equal to the threshold for background noise formation on the print media. Consequently, there was in fact no substantial backgrounding voltage region (corresponding to the region C on curve B in FIG. 3) and thus no background noise on the media below stylus voltage A2 where a linear increase in charge transfer begins. Thus region C (FIG. 3), where backgrounding occurs on the media, (i.e., where there is not a linear relationship between an increase in voltage on stylus 72 and an increase in charge deposited on media 75) has been eliminated. Note that while charge is deposited linearly on the print medium in response to an increase in stylus voltage from A2 to A3 in FIG. 3, toned areas created by stylus voltages between A2 and A3 result in images formed on the media which are of poorer quality than images formed with a stylus voltage substantially equal to A3. In practice, when a stylus image is desired to be printed on the media, voltage on the stylus is rapidly raised to voltage A3 to ensure that charge deposited on the print medium is sufficient to give a good quality image. Several other thicknesses of copper were investigated and resulting voltages A1 and A2 are graphed in FIG. 5. This study indicates that styli thinner than 12,000 angstroms would exhibit little additional reduction in the voltage difference A2−A1.

EXPERIMENT 3

A 0.00017 inch thick titanium stylus was fabricated on Kapton using first an intermediary adherent layer believed to be chrome. The resulting structure is identical to that shown in FIG. 7 with titanium electrode material 72 being substituted for copper. A dielectric paper 75 was passed over top surface 72*a* of stylus 72. The experiment yielded voltage A2 of about 365 volts and voltage A1 of 300 volts. These results were similar to the results obtained for a 0.00017 inch thick copper stylus. (See FIG. 5).

As a practical matter, thin styli (on the order of 12,000 angstroms) are difficult to work with and manufacture. Therefore, I have determined that one can achieve a reduction in backgrounding region C (FIG. 3) and at the same time use thicker styli than 12,000 angstroms shown in FIG. 5 in order to reduce voltage difference A2−A1. My discovery allows an engineer to pick the thickness of the styli to be compatible with the amount of backgrounding which is acceptable in the system being developed and the complexity and cost of the electronics allowed. As shown by FIG. 5, the magnitude of voltage difference A2−A1 that can be tolerated can be identified and then the thickness of the styli required to obtain that voltage difference can be determined. Accordingly, great flexibility in designing a system is achieved using my invention by allowing the designer to select both the amount of backgrounding which is acceptable and the stylus-to-stylus voltage difference allowable in the system and then determine the appropriate stylus thickness to achieve that result. Among factors which should be considered in determining stylus thickness will be; cost of fabricating the electrostatic print head, cost of the electronic circuitry used to drive the styli in the print head, desired life of the print head and quality of the images formed on the medium. Cost of the system includes a measure of useful life of the system which in turn is dependent upon maximum voltage between adjacent styli. This stylus to stylus voltage determines the lifetime of the electrostatic print head because degradation of dielectric material between adjacent styli is a direct function of voltage difference between adjacent styli.

Although voltage A1 shown in FIGS. 3, 4 and 5 is a fairly substantial voltage (this voltage is in the range of −200 to −400 volts) this voltage can be applied to all styli and styli pulsing electronics so that the voltage difference between styli represents only the difference between A1 and A3 and not the absolute magnitude of the voltage applied to the styli. Indeed, either the entire circuitry can be biased up to voltage A1 or alternatively the print medium can be biased up to voltage level A1 by use of a biased backplate.

While styli made of titanium and styli made of copper seem to give results which are totally compatible, an additional test on a stylus believed to be at least a substantial part zinc and on another stylus of aluminum gave different results. In fact, zinc, and aluminum styli gave results which were not compatible with results obtained by copper and titanium. However, enough tests have not been run yet on these materials (i.e., zinc, and aluminum) to determine whether the general shape of curves obtained using these materials as styli would in fact be similar to the shape of curves obtained using copper or titanium styli.

Further tests were conducted using beryllium and beryllium-copper styli. While complete experimental results for a wide range of thicknesses have not been obtained using beryllium or beryllium copper styli, FIG. 5 shows the difference between voltages A2 and A1 for a 0.0003 inch beryllium stylus. As shown in FIG. 5, this difference is approximately 55 volts. Thus, electronic circuitry for use with an electrostatic print head containing styli made of 0.0003 inch beryllium would be such as to required a voltage swing between an off and an on condition of about 205 volts if 150 volts are desired on the surface of the dielectric media prior to toning. Such circuitry is less expensive than circuitry used with prior art electrostatic print heads requiring 275 volts. Therefore, accepting voltage difference A2−A1 of about 55 volts allows the use of a 0.0003 inch beryllium styli in an electrostatic print head and achieves the results contemplated by this invention but with a thicker stylus than would be required if copper was used as a stylus material. Unfortunately beryllium is quite expensive.

A 0.0005 inch beryllium-copper stylus and 0.002 inch beryllium-copper stylus likewise achieved lower values for voltage difference A2−A1 than would be achieved by the use of pure copper. Accordingly, beryllium-copper styli can be used in accordance with the principles of this invention to form part of an electrostatic print head. By discovering that voltage difference A2−A1 associated with beryllium-copper is lower than for copper of similar thickness and yields relatively low cost electronic drive circuitry, I have discovered that beryllium-copper is an appropriate material for use as styli in electrostatic print heads in accordance with my invention. Indeed, the results from a stylus of 0.002 inch Beryllium-copper stylus indicate that a superior electrostatic print head could be constructed even if the styli were thick enough to be virtually square. The results from 0.002 inch Beryllium-copper also suggest that an electrostatic print head constructed by winding round wire on a mandrel would also produce superior print quality.

While experimental work with respect to use of a copper, titanium, aluminum, beryllium or beryllium-copper stylus is as described above, those skilled in the art will recognize in view of this disclosure that different materials and different thicknesses styli can also be implemented in accordance with my discovery.

I claim:

1. In an electrostatic print head containing a plurality of styli arranged to place electrostatic charge on a dielectric coated medium, the improvement wherein each stylus has a low impedance and a rectangular cross-section and wherein the thickness of the cross-section is selected such that the difference between the lowest voltage on the stylus at which the amount of electrical charge deposited on the medium for any increase in voltage on the stylus increases substantially in a linear manner and the lowest voltage on the stylus at which an unwanted background image is formed on the medium, is equal to or less than a selected number.

2. Structure as in claim 1 wherein said stylus comprises a copper material.

3. Structure as in claim 2 wherein said stylus is selected to have a thickness equal to or less than about 0.0005 inches.

4. Structure as in claim 1 wherein the thickness of said stylus is selected to be less than about 0.00006 inches.

5. Structure as in claim 1 wherein the stylus comprises titanium.

6. Structure as in claim 1 wherein the stylus comprises beryllium-copper.

7. Structure as in claim 1 wherein the thickness of the stylus is selected such that the voltage on the stylus at which any increase in stylus voltage results in charge being deposited on the medium adjacent the stylus in a manner linearly proportional to the voltage on the stylus is substantially the same as the voltage at which background noise visible on the medium begins and therefor the voltage difference between styli when the voltage on one stylus is at a level selected to form an image on the adjacent medium and the voltage on an adjacent stylus is selected so as to not form an image on the adjacent media is minimized.

8. Structure as in claim 7 where the styli in the electrostatic print head are made of beryllium-copper.

9. Structure as in claim 7 wherein said stylus comprises a copper material.

10. Structure as in claim 9 wherein said stylus is selected to have a thickness equal to or less than approximately 0.00006 inches.

11. Structure as in claim 7 wherein said stylus comprises titanium.

12. Structure as in claim 7 wherein said stylus comprises beryllium-copper.

13. Structure as in claim 1 wherein the thickness of the stylus is selected such that the voltage difference between the voltage on a stylus which has been selected to print an image on the medium adjacent to that stylus and the voltage on an adjacent stylus which is selected so as not to form an image on this adjacent medium is such as to achieve the desired lifetime for the electrostatic print head.

14. Structure as in claim 13 wherein said stylus comprises a copper material.

15. Structure as in claim 13 wherein said stylus comprises a titanium material.

16. Structure as in claim 13 wherein said stylus comprises a beryllium-copper material.

17. Structure as in claim 1 wherein (i) the thickness of the stylus cross-section is further selected such that, for the voltage difference between a stylus selected to print and an adjacent stylus selected not to print, the current flowing between adjacent styli is below a selected number and (ii) said styli comprise a copper material.

18. Structure as in claim 1 wherein (i) the thickness of the stylus cross-section is further selected such that, for the voltage difference between a stylus selected to print and an adjacent stylus selected not to print, the current flowing between adjacent styli is below a selected number and (ii) said styli comprise a titanium material.

19. Structure as in claim 1 wherein (i) the thickness of the stylus cross-section is further selected such that, for the voltage difference between a stylus selected to print and an adjacent stylus selected not to print, the current flowing between adjacent styli is below a selected number and (ii) said styli comprise a beryllium-copper material.

20. Structure as in claim 1 wherein said low impedance comprises a low resistance.

21. Structure as in claim 1 wherein (i) the thickness of the stylus cross-section is further selected such that, for the voltage difference between a stylus selected to print and an adjacent stylus selected not to print the current flowing between adjacent styli is below a selected number and (ii) said low impedance comprises a low resistance.

22. Structure as in claim 1, wherein the impedance of each stylus is substantially less than a megohm.

23. Structure as in claim 1, wherein the thickness of the stylus cross-section is further selected such that, for the voltage difference between a stylus selected to print and an adjacent stylus selected not to print, the current flowing between adjacent styli is below a selected value.

24. The structure of claim 23, said structure further comprising a means for applying said voltage difference between said stylus selected to print and said adjacent stylus selected not to print.

25. An electrostatic print head comprising a plurality of styli, each having a rectangular cross-section, arranged to place electrostatic charge on a dielectric print medium, the improvement wherein each stylus has a low impedance and the thickness of the stylus cross section is selected such that the voltage difference between a stylus selected to print and an adjacent stylus selected not to print will allow the distance between adjacent styli to be selected so that the current flowing between adjacent styli is below a selected number.

26. Structure as in claim 25, said structure further comprising a means for applying said voltage difference between said stylus selected to print and said adjacent stylus selected not to print.

27. Structure as in claim 25, wherein the impedance of each stylus is substantially less than a megohm.

28. An electrostatic print head comprising:

a plurality of styli arranged to place electrostatic charge on a dielectric coated medium, wherein the thickness of the cross-section is selected such that the difference between a first voltage, being the lowest voltage on the stylus at which the amount of electrical charge deposited on the medium for any increase in voltage on the stylus increases substantially in a linear manner, and a second voltage, being the lowest voltage on the stylus at which an unwanted background image is formed on the medium, is equal to or less than a selected value;

means for applying to selected ones of said plurality of styli a voltage higher than said first voltage when activating said selected ones of said plurality of styli for printing, and for applying a voltage less than or equal to said second voltage to each of said plurality of styli when not printing.

* * * * *